United States Patent
Foote et al.

(10) Patent No.: US 6,587,955 B1
(45) Date of Patent: Jul. 1, 2003

(54) REAL TIME SYNCHRONIZATION IN MULTI-THREADED COMPUTER SYSTEMS

(75) Inventors: William Foote, Cupertino, CA (US); Dean Roy Ernest Long, Boulder Creek, CA (US); Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/495,820

(22) Filed: Feb. 1, 2000

Related U.S. Application Data (60) Provisional application No. 60/121,711, filed on Feb. 26, 1999.

(51) Int. Cl.$^7$ .............................. G06F 1/12; G06F 9/00; H02H 3/05
(52) U.S. Cl. ........................ 713/400; 714/39; 709/107
(58) Field of Search ......................... 713/400; 714/39; 709/107

(56) References Cited

U.S. PATENT DOCUMENTS 5,797,004 A  *  8/1998  Lindholm et al. .......... 709/102
6,411,983 B1 *  6/2002  Gallop ....................... 709/104

OTHER PUBLICATIONS

Bacon et al., "Thin Locks: Featherweight Synchronization for JAVA", Association for Computing Machinery, NY, vol. 33, No. 5, May 1, 1998, pp. 258–268.

Miyoshi, A. et al., "Implementation and Evaluation of Real–Time JAVA Threads", Proceedings of the IEEE Real–Time Systems Symposium, US, Los Alamitos, CA, Dec. 2, 1997, pp. 166–175.

Lui S., et al., "Priority Inheritance Protocols: An Approach to Real–Time Synchronization" IEEE Transactions on Computers, US, IEEE, Inc. NY, vol. 39, No. 9, Sep. 1, 1990, pp. 1175–1185.

Shim et al, "Priority Inversion Handling in Microkernel–based Real–Time Mike",IEEE, 1996, pp. 238–245.*

* cited by examiner

Primary Examiner—Thomas Lee
Assistant Examiner—Suresh K Suryawanshi
(74) Attorney, Agent, or Firm—Beyer Weaver & Thomas LLP (57) ABSTRACT

Methods and apparatus for implementing priority inversion avoidance protocols and deterministic locking where an API is used to select objects in a multi-threaded computer system are disclosed. In one aspect of the invention, an enhanced monitor is associated with one or more selected objects by way of an associated API. The enhanced monitor is arranged to set behavior for a lock associated with the selected objects as determined by a user defined behavior object included within the enhanced monitor. In this arrangement, only the selected one or more objects are associated with the enhanced monitor.

19 Claims, 6 Drawing Sheets

REAL TIME SYNCHRONIZATION IN
MULTI-THREADED COMPUTER SYSTEMS

This application claims the benefit of Provisional application No. 60/121,711, filed Feb. 26, 1999.

BACKGROUND OF THE INVENTION

1. Field of Invention

The invention relates generally to methods and apparatus for synchronizing threads in a distributed object system. More particularly, the invention relates to methods and apparatus for providing desired locking behavior to one or more objects.

2. Description of Relevant Art

In general, a thread is a sequence of central processing unit (CPU) instructions or programming language statements that may be independently executed. During the execution of an object-based program, a thread may attempt to execute operations that involve multiple objects. On the other hand, multiple threads may attempt to execute operations that involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization primitive before invoking the method.

Since multiple threads must work together on a shared data resource, there must be a mechanism for preventing these threads from destroying data integrity by, for example, writing at the same time to a particular data area. This particular problem has been solved by using synchronization primitives such as locks, mutexes, semaphores, and monitors to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object.

In real time operating systems, in addition to be able to synchronize on shared resources, threads must be ranked according to their relative importance such that each thread has a corresponding priority. In such an operating system, the higher the priority of a particular thread the more important that the thread execute within a predefined time. By way of example, in a window manager, the thread responsible for cursor movement should have a higher priority than those threads looking after particular windows. Similarly, in an Internet browser, such as Netscape Communicator™, the thread drawing GIFs should be much lower than the thread running the control panel. In another example, in a spacecraft, the guidance and control thread, should be higher than the communications thread. Put more simply, the idea of thread priority is that higher priority threads get CPU time ahead of lower priority threads.

Figure 1:
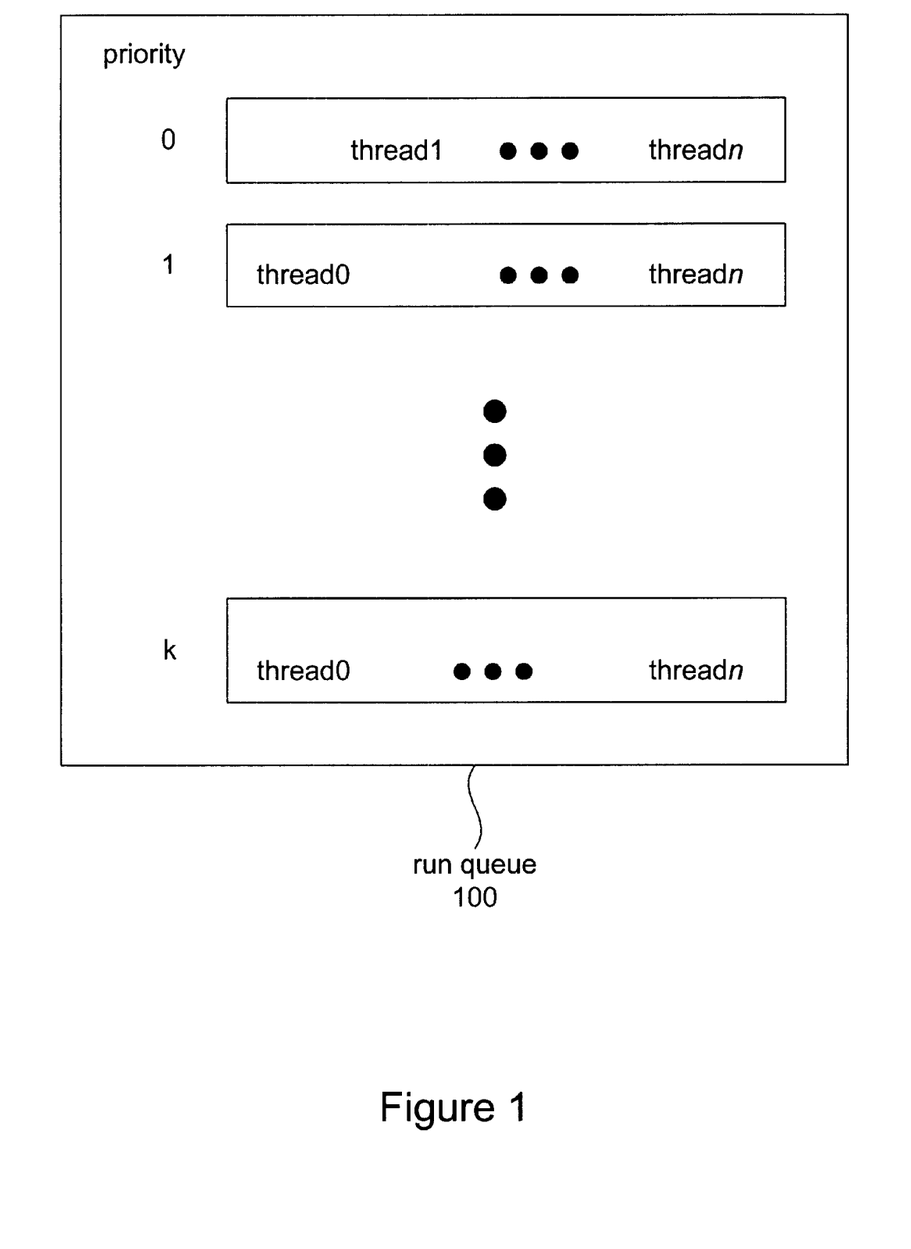
FIG. 1 is a conventional run queue.

In those systems having prioritized threads, scheduling of the prioritized threads is typically performed by a scheduler under the control of a scheduling algorithm. A typical scheduling algorithm requires that each thread have an integer priority (i.e., one that is bounded above and below by system constants) and that the scheduler works with what is referred to as a run queue. FIG. 1 illustrates a conventional run queue 100. The run queue 100 is an ordered queue of n threads (thread0 through threadn) having k priority levels (1 through k). During scheduling, when an active thread is preempted (i.e., a higher priority thread becomes active), the preempted thread (lower priority) is placed at the head of the queue 100 associated with its particular priority. By way of example, if a thread10 (thread 1 having a priority of 0) is preempted by a thread01 (i.e., a thread 0 having a priority of 1), then the thread1 is placed at the head of the queue associated with the priority 0. In this way, the preempted thread1 is runnable ahead of any thread of the same priority.

Figure 2:
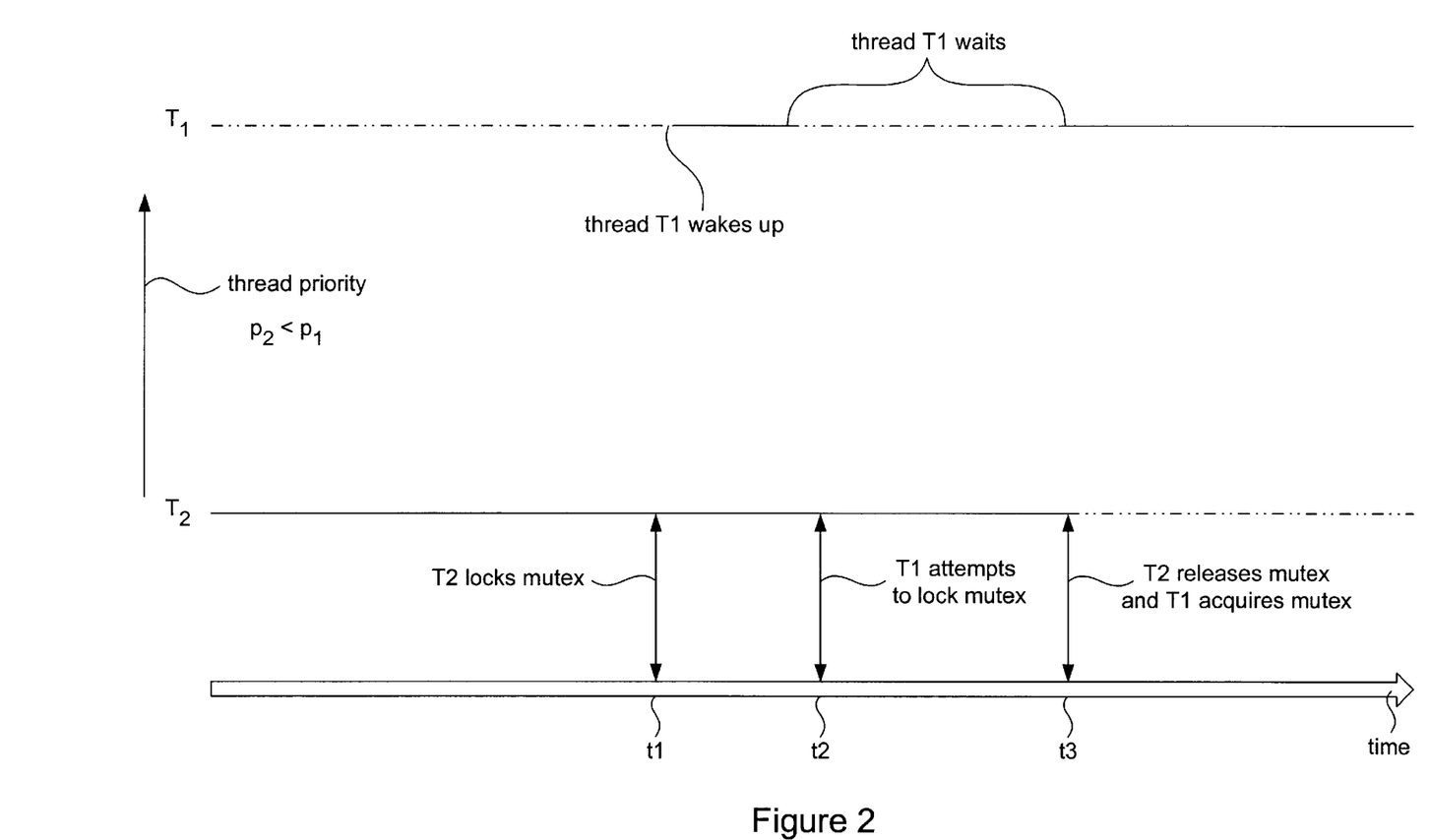
FIG. 2 graphically illustrates an example of bounded priority inversion.

In those situations where the highest priority thread is kept from running, what is referred to as priority inversion occurs. FIG. 2 illustrates an example of bounded priority inversion well known to those skilled in the art. By bounded priority inversion, it is meant that the high priority thread is kept from running for a limited period of time. Referring to FIG. 2, suppose a high priority thread T1 becomes blocked waiting for a particular event to happen. During the period that the thread T1 is blocked, suppose a low priority thread T2 starts to run and in doing so obtains (i.e., locks) a mutex for a shared resource at a time t1. While the mutex is locked by the low priority thread T2, the event that the thread T1 is waiting for occurs and thereby wakes up the high priority thread T1. Priority inversion takes place when the high priority thread T1 attempts to lock the mutex held by the low priority thread T2 at a time t2. In effect the high priority thread T1 must wait for the low priority thread T2 to release the mutex at time t3. It is called bounded inversion since the inversion is limited by the duration that the mutex for the shared resource is locked by the low priority thread t2.

In some situations, however, a more disruptive priority inversion referred to as an unbounded priority inversion can occur. By unbounded priority inversion it is meant that a high priority thread is kept from running for what could potentially be an unlimited (or unbounded) length of time. For example, suppose a high-priority thread T1 waits for a resource locked by a low-priority thread T3 at a time T1, and the low-priority thread T3 waits while a middle-priority thread T2 executes. In this situation, the high-priority thread T1 is made to wait while a thread of lower priority (the middle-priority thread T2) executes. In this situation, the medium level thread T2 running prevents the low priority thread T3 from releasing the lock. All that is required for this to happen is that while the low level thread T3 has locked the mutex, the medium level thread T2 becomes unblocked (thereby preempting the low level thread T3) which then runs indefinitely.

There are several well-known priority inversion avoidance protocols which have been used extensively to prevent, or at least, substantially reduce the incidence and effect of priority inversions. One such approach to avoiding priority inversion, and more particularly, unbounded priority inversion is referred to as a priority inheritance protocol. As is well known in the art, priority inheritance means that when a thread waits on a mutex owned by a lower priority thread, the priority of the owner is increased to that of the waiter. In the priority inheritance protocol when a thread locks a mutex its priority is not changed. The action takes place when a thread attempts to lock a mutex owned by another thread. In this situation the priority of the thread owning the mutex is raised to the priority of the blocked thread (if higher). When the thread releases the mutex its old priority (i.e. prior to locking this mutex) is restored. This prevents unbounded priority inversion since the low priority thread gets a high priority and thus cannot be pre-empted by medium priority thread.

Another conventional approach used to avoid unbounded priority inversion is referred to as priority ceiling protocol. As well known in the art, priority ceiling means that while a thread owns the mutex it runs at a priority higher than any other thread that may acquire the mutex. In the priority ceiling solution each shared mutex is initialized to a priority ceiling. Whenever a thread locks this mutex, the priority of the thread is raised to the priority ceiling. This works as long as the priority ceiling is greater than or equal to the priorities of any thread that may lock the mutex (hence its name). The action takes place when a thread attempts to lock a mutex owned by another thread. It should be noted, however, that with priority ceiling, a thread can lock a mutex only if its priority is less than or equal to the ceilings of all other locked mutexes.

Unfortunately, even though these priority inversion avoidance protocols have been successfully used to substantially reduce, and/or eliminate, the incidence of priority inversion, implementation in many computing systems it is prohibitively expensive in terms of both system and programmer resources in systems that contemplate very wide use of monitors. For example, in a Java based computing system each object has a lock associated with it. In this type of system, neither the priority ceiling nor the priority inheritance protocols can be efficiently implemented due to the large number of objects and associated locks included in the system. In order to implement either or both protocols in a Java based system, every object in the system would have to be associated with the protocol. This would represent a substantial investment in system resources since only a small fraction of all objects included within the system would actually benefit from implementation of priority inversion avoidance. As a result, any solution to priority inversion that imposes a significant overhead, in either time or space, on every object in a running system would be unacceptable.

In view of the foregoing, it should be apparent that improved mechanisms and frameworks for avoiding priority inversion in a multi-threaded computer system would be desirable.

SUMMARY OF THE INVENTION

To achieve the foregoing and other objectives, improved mechanisms for implementing priority inversion avoidance protocols in a multi-threaded computer system are described. In one aspect of the invention, an enhanced monitor is associated with one or more selected objects. In one embodiment, the enhanced monitor is arranged to set behavior for a lock associated with the selected objects as determined by a user defined behavior object included within the enhanced monitor. In this arrangement, only the selected objects are provided with the selected lock behavior.

In some embodiments, the behavior set by the enhanced monitor is a priority inversion avoidance protocol. In this arrangement, the priority inversion avoidance protocol is implemented for only those objects for which it is required. In this way, priority inversion is implemented without imposing significant system overhead, in either time or space, on every object in a running system.

In a described embodiment, an enhanced monitor flag is included in those object headers for those objects requiring the priority inversion avoidance protocol.

In some preferred embodiments, the priority inversion avoidance protocol is either a priority ceiling protocol or a priority inheritance protocol.

In another aspect of the invention an enhanced method of synchronization is described. If an object requires enhanced synchronization, then an enhanced monitor arranged to provide the enhanced synchronization is identified. Once the appropriate enhanced monitor is identified, then it is associated with the object. In one embodiment, the enhanced monitor includes a user defined behavior object that provides the desired object lock behavior.

BRIEF DESCRIPTION OF THE DRAWINGS

The invention, together with further advantages thereof, may best be understood by reference to the following description taken in conjunction with the accompanying drawing in which.

DETAILED DESCRIPTION OF THE EMBODIMENTS

In the following description frameworks and methods of providing objects with selected behavior are described. In general, an object requiring specialized behavior, such as specific monitor locking protocols, calls an enhanced monitor. In the described embodiment, the enhanced monitor includes a user defined behavior object that is arranged to provide the specialized behavior required by the object.

In one embodiment of the invention, the enhanced monitor provides the object with special monitor locking protocols designed to prevent priority inversion as well as providing deterministic locking. Such priority inversion avoidance protocols include both priority ceiling and priority inheritance protocols.

The invention will initially be described in terms of a real time multi-threaded, object-based computing system, that includes a plurality of prioritized threads for which one or more of the threads require some form of priority inversion avoidance. In such a system, objects are typically provided with synchronization constructs to make it possible to prevent more than one thread from operating on an object at any particular time. One such synchronization construct is referred to as a monitor. A monitor is generally arranged such that only the thread which owns the monitor associated with an object is permitted to execute a synchronized operation on that object. In the described embodiment, monitors are sub-divided into standard monitors and enhanced monitors. Standard monitors may be either lightweight or heavyweight. Typically, lightweight monitors are preferable for objects that are not subject to contention, whereas heavyweight monitors are preferably used to handle contended monitor operations.

Since experience has shown that the majority of monitor operations do not contend with monitor operations performed by other threads, one attempt at improving monitor utilization utilizes a small number of bits in the object header to handle the non-contended monitor operations. One such implementation, referred to as a "thin lock", or lightweight monitor, is described in "Thin Locks: Featherweight Synchronization for Java" by David F. Bacon et al. (1998), 258–268 which is incorporated by reference in its entirety. As described, the lightweight monitor is formed of bits reserved in the object header that identifies which thread, in the form of a thread ID, owns the lightweight monitor and therefore has locked the associated object. In the case when monitor contention does occur, the virtual machine allocates a heavyweight monitor for the contended object.

However, in those systems having prioritized threads, it is desirable to have the capability of providing priority inversion avoidance protocols for only those objects for which priority inversion is critical. In addition to selectively providing for priority inversion avoidance for one or more objects and deterministic locking, contention synchronization for substantially all objects is also necessary. In a described embodiment of the invention, this is accomplished by implementing an enhanced monitor in addition to the standard monitor. In the described embodiment, the enhanced monitor is capable of being associated with only those objects for which priority inversion is appropriate thereby substantially preventing the occurrence of priority inversion for those threads for which execution within a limited period of time is important. Such threads include, for example, navigation threads in a spaceship as well as cursor threads in a window program.

Figure 3A:
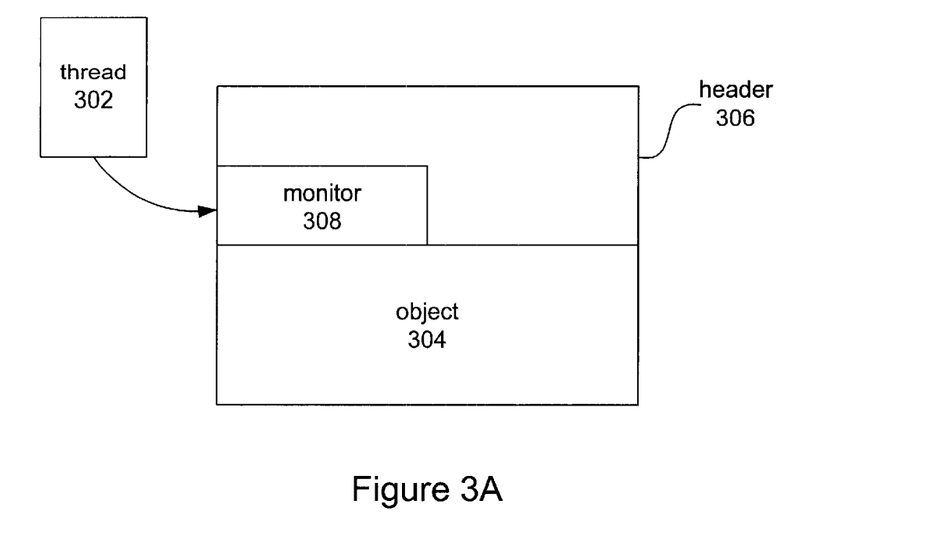
FIG. 3a is an illustration of object and an associated standard monitor.

FIG. 3a is a diagrammatic representation of the interface between a thread, an object, and a standard monitor in an object based system. A thread 302 attempts to execute the synchronization operation on an object 304 having a header 306. In order to execute synchronization operation, the thread 302 must first determine if the object 304 is owned by another thread and therefore unavailable, or locked. The thread 302 determines whether or not the object 304 is locked by entering a standard monitor 308 included in the object header 306. The standard monitor 308 represents either a lightweight monitor (otherwise referred to as a thin lock) or a pointer to a heavyweight monitor (also referred to as a fat lock). One bit in the standard monitor 308 (referred to as HEAVY_FLAG) indicates whether the standard monitor 308 is a lightweight monitor or a heavyweight monitor pointer. When the standard monitor 308 is a lightweight monitor, the HEAVY_FLAG is set to "0" and, conversely, is the HEAVY_FLAG is set to "1" if it contains a heavyweight monitor pointer.

Figure 3B:
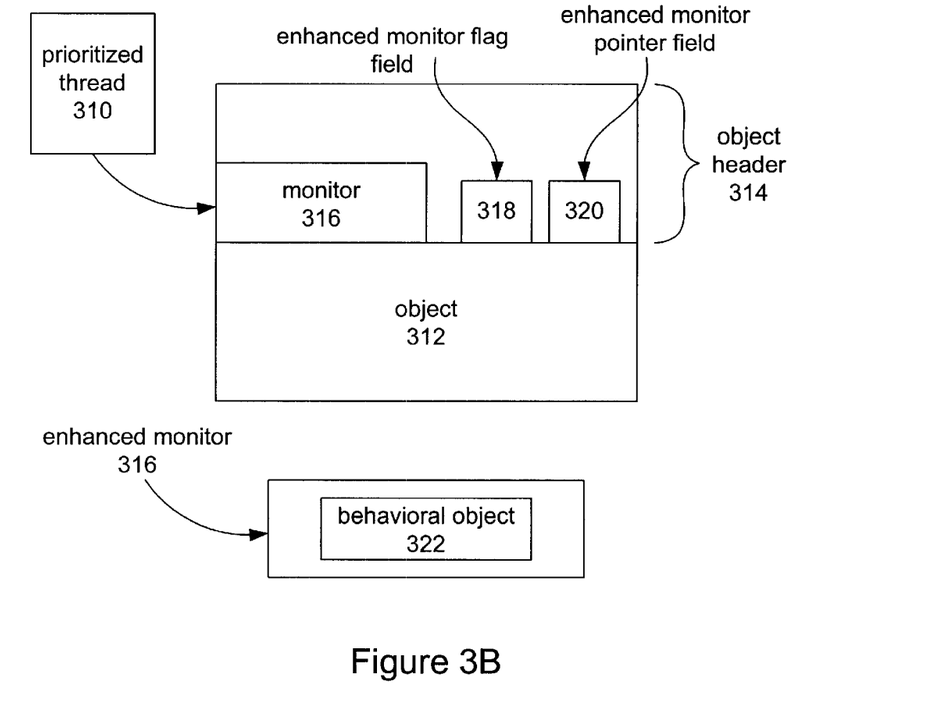
FIG. 3b is an illustration of an object and an associated enhanced monitor in accordance with an embodiment of the invention.

FIG. 3b is a diagrammatic representation of the interface between a prioritized thread for which timely execution is critical, an object, and an enhanced monitor in an object based system. A prioritized thread 310 attempts to execute a synchronization operation on an object 312 having an object header 314. In the described embodiment, the object 312 is identified as requiring synchronization semantics, or behavior, as provided by an enhanced monitor 316 by an ENHANCED_MONITOR flag field 318 included in the object header 314. The ENHANCED_MONITOR flag field 318 is used to identify the object 312 as one of the one or more objects included in the system for which behavior provided by the enhanced monitor 316 is important. Such behavior includes a special monitor lock that provides, for example, priority inversion avoidance protocols such as priority ceiling or priority inheritance. In this way, any excess system overhead is minimized and the advantages of implementing a desired priority inversion avoidance protocol is realized. In addition to the ENHANCED_MONITOR flag field 318, the object header 314 includes an enhanced monitor pointer field 320 that is used to identify a particular enhanced monitor that provides the locking behavior determined to be important for proper real time thread execution.

In one embodiment of the invention, the enhanced monitor 316 augments the standard monitor 308 by incorporating a behavioral object 322. The behavioral object 322 provides, in one implementation, object-locking behavior as determined by the user. In this way, only those objects requiring such object-locking behavior are flagged. In addition, since the behavioral object 322 is selectable, the particular object-locking behavior associated with the behavioral object 322 can be modified as needed.

Figure 4:
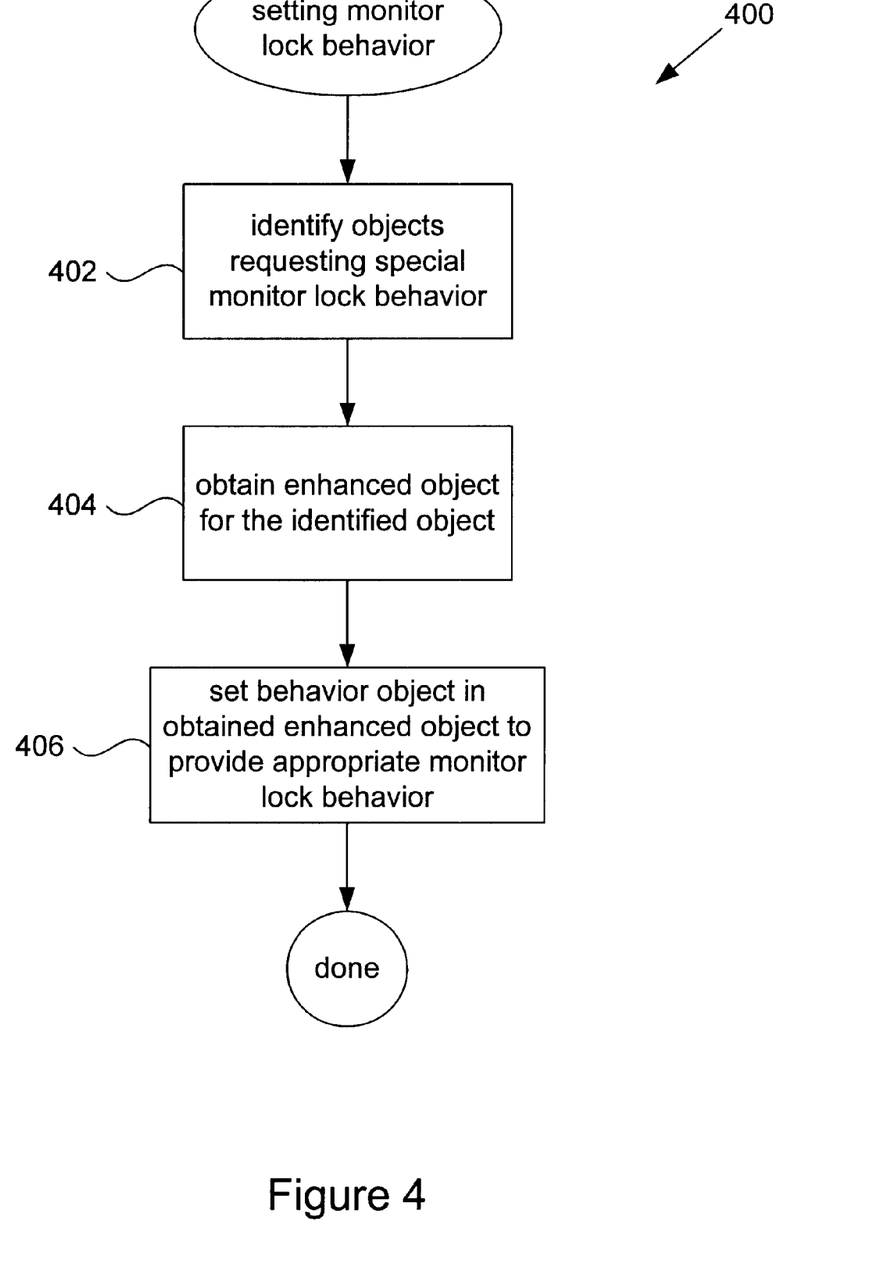
FIG. 4 is a flow diagram detailing a process for setting behavior for an object lock in accordance with an embodiment of the invention.

Referring now to FIG. 4, a flowchart describing a process 400 for setting desired behavior in an enhanced monitor in accordance with an embodiment of the invention, is illustrated. The process 400 begins a 402 by identifying those objects for the special behavior is desirable. Such objects include those for which time critical tasks is important and as such, utilizing a priority inversion avoidance protocol is addition to thread synchronization is important. At 404, an enhanced monitor is obtained for the identified object and at 406, the behavior object included in the enhanced monitor is set to provide the desired behavior. In one particular implementation, the behavior object is set to provide the associated object lock with a priority inversion avoidance protocol. In this way, only those objects for which contention for time critical tasks is a concern are selected. All unselected objects in the system retain access to standard monitors such that system overhead required to selectively implement a desired priority inversion avoidance protocol is minimized.

Figure 5:
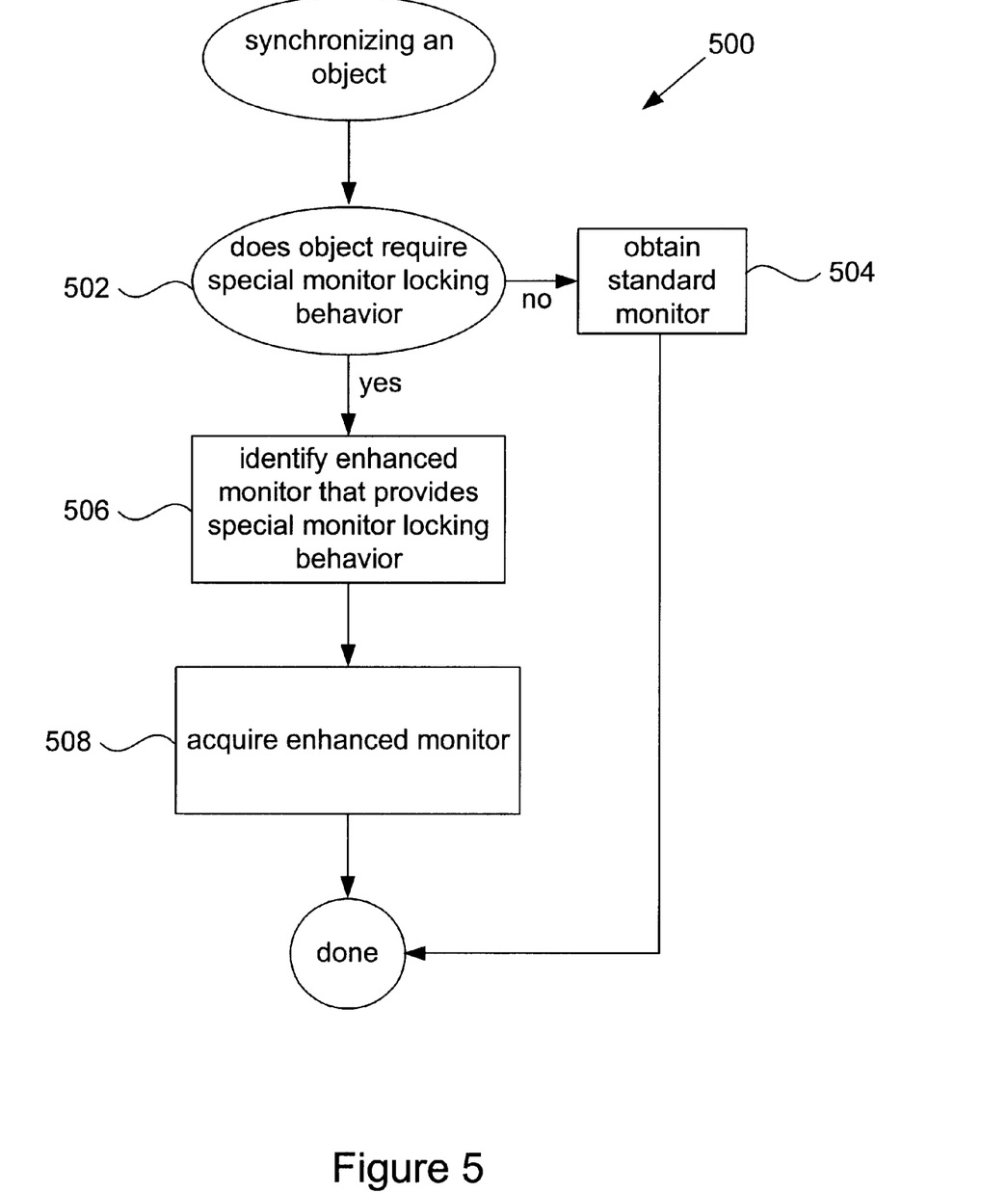
FIG. 5 is a flow diagram detailing a synchronization process in accordance with an embodiment of the invention.

FIG. 5 is a flowchart detailing a process 500 for synchronizing an object in accordance with an embodiment of the invention. The process 500 begins at 502 with a determination whether or not the object requires special behavior provided by an enhanced monitor. In the described embodiment, any object requiring the enhanced monitor will have an enhanced monitor flag set in its object header. In this way, only those one or more objects in the distributed object system requiring the enhanced monitor are flagged. If the object does not require special behavior, then a standard monitor is obtained at 504. On the other hand, if the enhanced monitor flag is set indicating that the object requires the enhanced monitor, then at 506 the enhanced monitor indicated by the enhanced monitor pointer is identified. Once the appropriate enhanced monitor is identified, the object acquires the enhanced monitor at 508. In this way, the object acquires the lock provided by the behavior object included in the enhanced monitor.

Figure 6:
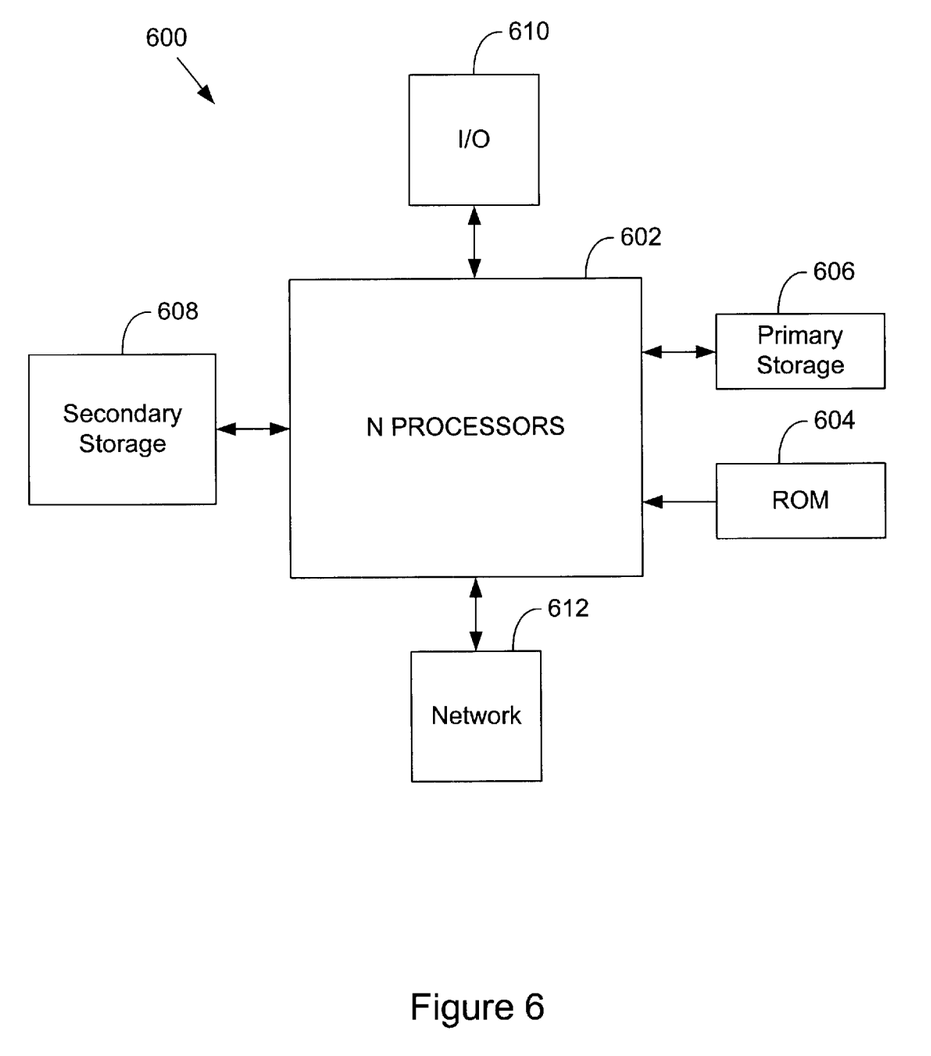
FIG. 6 illustrates a typical, general-purpose computer system suitable for implementing the present invention.

FIG. 6 illustrates a typical, general-purpose computer system suitable for implementing the present invention. Computer system 600 or, more specifically, CPUs 602, may be arranged to support a virtual machine, as will be appreciated by those skilled in the art. As is well known in the art, ROM acts to transfer data and instructions uni-directionally to the CPUs 602, while RAM is used typically to transfer data and instructions in a bi-directional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, operations involved with locking an object and unlocking an object may be reordered and may also be removed or added without departing from the spirit or the scope of the present invention.

Although the described arrangement works particularly well with object based systems such as the Java™ runtime environment, it may readily be used in any suitable object-based environment. It should be noted that the number of bits associated with a monitor are generally be widely varied. In addition, it should be appreciated that the status of an object may be identified using mechanisms other than a monitor. By way of example, the object may include a pointer to a list that identifies the status of the object.

While the present invention has been described as being used with a computer system that has an associated virtual machine, it should be appreciated that the present invention may generally be implemented on any suitable object-oriented computer system. Specifically, the methods of locking an unlocking an object in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claim is:

1. In a multi-threaded computing system that includes a plurality of threads and a plurality of objects substantially all of which have an associated standard monitor, wherein the standard monitor provides a lock mechanism suitable for locking the associated object when a thread enters the standard monitor such that no other thread can enter the standard monitor until released by the thread, a method of setting desired locking behavior for one or more of the objects, comprising:

associating an enhanced monitor with the one or more objects, wherein the enhanced monitor is arranged to set appropriate locking behavior for the one or more objects as determined by a user defined behavior object included within the enhanced monitor.

2. A method as recited in claim 1, wherein the one or more objects are identified by a user.

3. A method as recited in claim 1, wherein the selected object includes an object header that includes an enhanced monitor pointer field.

4. A method as recited in claim 3, wherein the enhanced monitor pointer field includes an enhanced monitor pointer used to identify the corresponding enhanced monitor having an appropriate behavior object.

5. A method as recited in claim 4, wherein each of the plurality of threads has an associated priority, wherein a thread's priority is indicative of the importance of the thread's execution.

6. A method as recited in claim 5, wherein the behavior object is arranged to selectably provide a priority inversion avoidance protocol to the associated object.

7. A method as recited in claim 6, wherein the priority inversion avoidance protocol is selected from the group comprising: priority inheritance protocol and priority ceiling protocol.

8. A method as recited in claim 7, wherein the object is a JAVA object.

9. In a multi-threaded computing system that includes a plurality of threads and a plurality of objects substantially all of which have an associated standard monitor, wherein the standard monitor provides a standard synchronization on an associated object by providing a lock mechanism suitable for locking the associated object when a thread enters the standard monitor such that no other thread can enter the standard monitor until released by the thread, a method of enhanced synchronization on a selected object, comprising:

determining if the object requires enhanced synchronization;

identifying an enhanced monitor suitably arranged to provide the enhanced synchronization; and associating the enhanced monitor with the object; wherein the enhanced monitor is arranged to set behavior for the object as determined by a user defined behavior object included within the enhanced monitor.

10. A method as recited in claim 9, wherein the object is identified by the user.

11. A method as recited in claim 10, wherein the object includes an object header that includes an enhanced monitor pointer field.

12. A method as recited in claim 11, wherein the enhanced monitor pointer field includes an enhanced monitor pointer used to identify the corresponding enhanced monitor having an appropriate behavior object.

13. A method as recited in claim 12, wherein each of the plurality of threads has an associated priority, wherein a thread's priority is indicative of the importance of the thread's execution.

14. A method as recited in claim 13, wherein the behavior object is arranged to selectably provide a priority inversion avoidance protocol to the associated object.

15. A method as recited in claim 14, wherein the priority inversion avoidance protocol is selected from the group comprising: priority inheritance protocol and priority ceiling protocol.

16. A method as recited in claim 15, wherein the object is a JAVA object.

17. A method as recited in claim 9, wherein the standard monitor includes a lightweight monitor pointer when the object in uncontended.

18. A method as recited in claim 9, wherein the standard monitor includes a heavyweight monitor pointer when the object is contended, wherein the heavyweight monitor provides standard synchronization behavior for the contending objects.

19. A method as recited in claim 9, wherein the object header includes an enhanced monitor flag indicative of the object requiring the enhanced monitor.

* * * * *